United States Patent Office 2,768,191
Patented Oct. 23, 1956

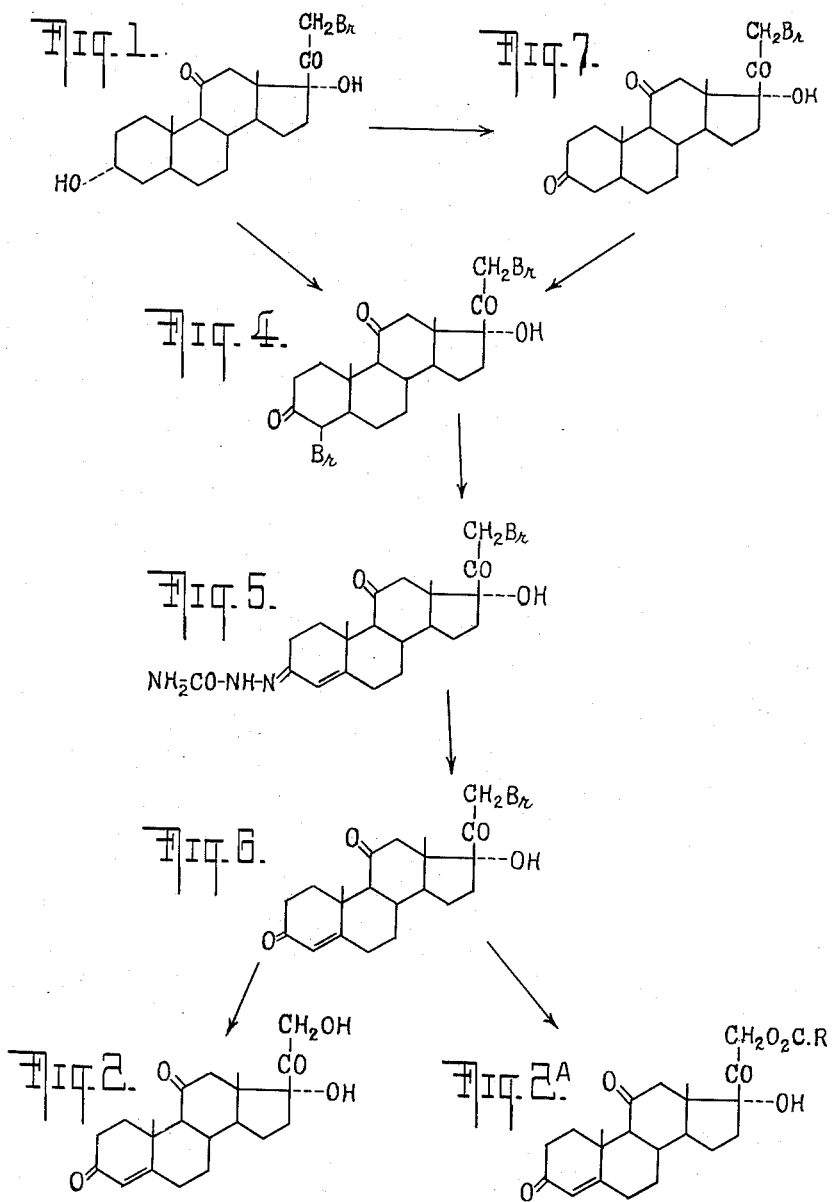

2,768,191

PROCESS OF PRODUCING CORTISONE AND ITS ESTERS

Julien Warnant, Paris, and Gerard Nomine, Noisy-le-Sec, France, assignors to Les Laboratoires Francais de Chimiotherapie, Paris, France, a corporation of France Application October 7, 1953, Serial No. 384,562

Claims priority, application France May 20, 1953

13 Claims. (Cl. 260—397.45)

This invention relates to an improved process of producing cortisone and its esters, and more particularly to an improved process of making said compounds from $3\alpha,17\alpha$-dihydroxy-21-bromo pregnane-11,20-dione.

The compound $3\alpha,17\alpha$-dihydroxy-21-bromo pregnane-11,20-dione of the following Formula I

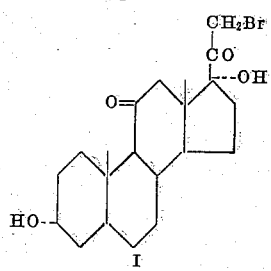

I has become readily available by the process described by Theodore H. Kritchevsky, David L. Garmaise, and T. F. Gallagher in "Journal of the American Chemical Society," vol. 74, pages 483–486 (1952). Said compound can be converted by the usual procedure into cortisone of the following Formula II

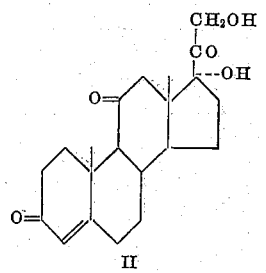

II and its esters by replacing the bromine atom in 21-position by an acyloxy group or by a hydroxyl group which subsequently may be acylated, oxidizing the alcohol group in 3-position to convert the same into the keto group, and brominating the resulting triketone in α-position to the keto group, i. e., in 4-position. In this manner the $17\alpha$-hydroxy-21-acyloxy-4-bromo pregnane-3,11,20-trione of the following Formula III was obtained.

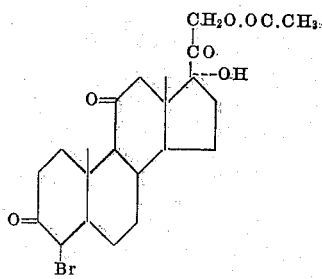

III

Dehydrobromination of said compound was carried out by the method of Vernon R. Mattox and Edward C. Kendall, published in "Journal of the American Chemical Society," vol. 72, pages 2290–2292 (1950) whereby first a semicarbazone is formed which is then split up to the $\Delta^4$-unsaturated ketone, i. e., cortisone and its esters.

The bromo ketone of the Formula III when produced according to this known process by direct bromination is usually contaminated by secondary reaction products which must be carefully removed in order to produce a pure cortisone acetate. Such purification of the brominated compounds, however, involves considerable losses; consequently, the overall yield of cortisone or its esters obtained according to this process is rather low.

It is one object of the present invention to provide a method of converting $3\alpha,17\alpha$-dihydroxy-21-bromo pregnane-11,20-dione directly into $17\alpha$-hydroxy-4,21-dibromo pregnane-3,11,20-trione which is then subjected to further reactions consisting in splitting off hydrobromic acid and creating a double bond in 4,5-position and in exchanging the 21-bromine atom by a hydroxyl group or an acyloxy group, thus, yielding cortisone and its esters.

Other objects of this invention and advantageous features thereof will become apparent as the description proceeds.

In co-pending application of Gerard Nomine and Julien Warnant relating to "A Method of Producing α-Brominated Keto Steroid Compounds," S. N. 360,878, filed on the 11th of June 1953, a method of producing such α-brominated keto steroids is disclosed which comprises the steps of heating a mixture of N-bromo succinimide and a keto steroid compound in the presence of an oxidizable alcohol to a temperature between about 50° C. and about 70° C. whereby the molar ratio of keto steroid compound, N-bromo succinimide, and oxidizable alcohol is about 1 mol of keto steroid compound to about 2 mols of N-bromo succinimide to at least about 1 mol of oxidizable alcohol, and separating the resulting α-brominated keto steroid compound from the reaction mixture. This bromination process is advantageously applied to corresponding hydroxy steroid compounds with oxidizable hydroxyl groups. Such oxidizable hydroxyl groups are thereby converted into keto groups and are then brominated in α-position to said keto groups.

It was found that this process of oxidative bromination can be applied with good results to the bromo compound of Formula I, i. e., to $3\alpha,17\alpha$-dihydroxy-21-bromo pregnane-11,20-dione. Thereby the hydroxyl group in 3-position is oxidized to a keto group and bromine is introduced into the molecule at the 4-carbon atom. The $17\alpha$-hydroxy-4,21-dibromo pregnane-3,11,20-triketone of Formula IV is obtained. The oxidizable alcohol required for carrying out said bromination is supplied by the molecule of the starting material, the dihydroxy bromo ketone itself. The dibrominated triketone corresponds to the following Formula IV:

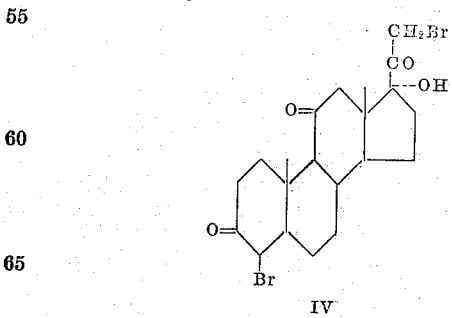

IV

In this manner it is possible to produce the dibromo triketone of Formula IV in a purity sufficient for further reactions. On reacting said compound with semicarbazide, the 3-semicarbazone of Formula V (see the attached flow sheet) is obtained and at the same time dehydrobromination takes place causing the introduction of a double bond in 4,5-position of the molecule. It is surprising that the bromine atom in 21-position remains unchanged during said reactions. The reaction conditions employed in the process of this invention are adjusted in such a manner that the keto group in 20-position is not converted into a semicarbazone group thereby forming a 3,20-disemicarbazone. One may also use other hydrazines for this reaction. Especially suitable is, besides semicarbazide, the 2,4-dinitro phenyl hydrazine. The unsaturated semicarbazone of Formula V is then split up to the corresponding ketone of Formula VI (see the attached flow sheet). On saponifying the bromine atom in 21-position it is converted into a hydroxyl group yielding cortisone of Formula II. When reacting the bromo compound of Formula VI with the alkali or silver salts of carboxylic acids, especially of aliphatic and alicyclic acids, the esters of cortisone are obtained. The invention is illustrated in the accompanying flow sheet.

In order to produce the dibromo triketone of Formula IV from the 21-bromo-3α,17α-dihydroxy-11,20-diketone of Formula I by means of N-bromo succinimide, one may add to the reaction mixture an oxidizable alcohol, such as isobutanol, benzyl alcohol and others. As stated above the starting material itself may serve as such an oxidizable alcohol. One may also first oxidize the brominated hydroxy diketone of Formula I to the corresponding triketone of Formula VII, i. e., to the 17α-hydroxy - 21 - bromo - pregnane - 3,11,20 - trione, and then brominate said ketone by means of N-bromo succinimide in the presence of an oxidizable alcohol.

The semicarbazone may be prepared either by the action of free semicarbazide in alcoholic medium upon the dibrominated triketone of Formula IV, or according to the conventional procedure by the action of semicarbazide chlorohydrate in the presence of sodium acetate in alcoholic or in acetic acid medium upon said compound. Good yields are obtained when working in an inert gas atmosphere, such as in nitrogen, and at a slightly elevated temperature.

Cleavage of the semicarbazone of Formula V is preferably effected by means of pyruvic acid or by means of p-hydroxy benzaldehyde whereby an exchange of the semicarbazone residue takes place. Acid hydrolysis which may also be employed produces the brominated triektone of Formula VI in a lower yield than when working as just mentioned with pyruvic acid, etc.

Saponification of the 21-bromo triektone of Formula VI to cortisone may be effected by means of methanolic alkali hydroxide solutions whereby the saponification temperature is preferably between 20° C. and 30° C. To directly convert said bromo ketone of Formula VI into cortisone esters, such as cortisone acetate, said bromo ketone is allowed to react first with sodium iodide to replace the bromine atom by iodine. Potassium acetate reacts then readily with the resulting iodide thereby yielding cortisone acetate and potassium iodide. Other methods of replacing the bromine atom in 21-position by an acyloxy group may, of course, also be used.

A comparison of the yields obtained according to the process of Kritchevsky, Garmaise, and Gallagher (l. c.) with the yields obtained according to the process of this invention, clearly shows the advance in the art achieved by the present invention. While the overall yield of the Kritchevsky, Garmaise, and Gallagher process starting with 3α,17α - dihydroxy - 21 - bromo - pregnane - 11,20 - dione and resulting in pure cortisone acetate is about 20%, the overall yield according to the process of the present invention is about 35%, i. e., about 75% higher. It could not be expected that by proceeding according to this invention not only a smaller number of reaction steps would be required but also that the yield could be increased and, consequently, the price of cortisone and its ester, compounds which are still quite expensive remedies, would be reduced.

The following examples illustrate the various steps of the process according to this invention without, however, limiting the same thereto. The melting points are determined by means of the Maquenne block and indicate the points where instantaneous melting takes place.

*Example 1.—Preparation of 4,21-dibromo-17α-hydroxy pregnane-3,11,20-trione (Formula IV)*

100 g. of 3α,17α-dihydroxy-21-bromo pregnane-11, 20-dione of Formula I, having a melting point of 215° C., 700 cc. of tertiary butanol, and 70 cc. of water are introduced into a two neck, 3 liter round bottom flask provided with reflux condenser, stirring device, and thermometer. The mixture is stirred while heating on a water bath. As soon as the inner temperature has been raised to 65° C., the water bath is removed and 88 g. of N-bromo succinimide are added at once to the homogeneous solution obtained. Oxidation proceeds rapidly. The bromo succinimide dissolves and the solution attains a reddish color due to the bromine set free thereby. The reaction is strongly exothermic. It is, therefore, necessary to cool the flask by means of ice water in order to maintain the temperature at 65–70° C. After a few minutes, part of the non-brominated triketone crystallizes. It subsequently dissolves according to the rate at which bromination proceeds. While the temperature is maintained at 65–70° C., the solution gradually decolorizes. The initially formed triketone is completely dissolved after 35 minutes and a yellow transparent liquid results.

1150 cc. of water, previously heated to 65–70° C., are then added to said solution within 10 minutes thereby maintaining the temperature at 65–70° C. Said water addition causes crystallization of the desired bromo derivative. The mixture is allowed to cool, the crystals are filtered off as soon as the temperature has decreased to 60° C., are washed with water of the same temperature, and are dried.

76.5 g. of a colorless bromo compound are obtained. Yield: 65%. Melting point: 204° C.; rotary power $[\alpha]_D$: +100° C. (c: 1% in acetone).

Analysis: $C_{21}H_{28}O_4Br_2$:

Calculated _____ 31.7% Br
Found _____ 30.8% Br

Said product is pure enough for further reactions. To completely purify the compound, it is triturated with 2 parts by volume of acetone and heated under reflux for 30 minutes. The mixture is then cooled to −10° C., the crystals are filtered off, and suspended in 10 parts by volume of water. The suspension is heated, while stirring, to 90–100° C. in order to remove acetone of crystallization.

The resulting purified product is dried. The yield is 80%. Its melting point is 210° C. and remains unchanged on further recrystallization. Its rotatory power is $[\alpha]_D$: +105° (c: 1% in acetone).

Analysis: $C_{21}H_{28}O_4Br_2$:

Calculated _____ 50.01% C; 5.60% H; 31.7% Br
Found _____ 50.0% C; 5.8% H; 31.1% Br

*Example 2.—Bromination of 17α-hydroxy-21-bromo pregnane-3,11-20-trione (Formula VII)*

2 g. of 17α-hydroxy-21-bromo pregnane-3,11,20-trione, melting at 245° C. and having a rotatory power of $[\alpha]_D$: +85.8° (c: 1% in chloroform), 20 cc. of tertiary butanol, 0.3 cc. of water, and 0.56 cc. of benzyl alcohol (1.1 mol) are introduced into a three neck 50 cc. round bottom flask. The mixture is heated to 60° C. and 1.84 g. of N-bromo succinimide (2.2 mol) are added, while stirring, to the resulting suspension. The temperature is maintained at 60° C. The mixture attains a red color and starts to progressively decolorize. After heating for half an hour, a colorless solution is obtained. Said solution is poured into 100 cc. of a mixture of water and ice containing 4 cc. of commercial sodium bisulfite solution. A colorless product crystallizes. It is filtered off, washed with water and subsequently four times with 5 cc. each of ether, and is dried at 40° C. 1.75 g. of the crude dibromo product are obtained corresponding to a yield of 75%. Melting point: 188° C.; rotatory power $[\alpha]_D$: +94.1° (c: 1% in acetone); bromine content 28.2%.

The crude product is heated under reflux in 3 parts by volume of 75% acetic acid for 5 minutes. The mixture is allowed to stand at room temperature for several hours, the crystals are filtered off, and dried at 40° C. The yield, on purification, is 87%. The purified product melts at 197° C. and has a rotatory power of $[\alpha]_D$: +97°±1 (c: 1% in acetone). The total yield on brominating the above mentioned triketone is 67%. To prepare a product for analysis it is again recrystallized from acetone. It melts then at 210° C., its rotatory power is $[\alpha]_D$: +105°±1 (c: 1% in acetone).

Analysis: $C_{21}H_{28}O_4Br_2$:

Calculated _____ 50.01% C; 5.6% H; 31.7% Br
Found _____ 50.0% C; 5.8% H; 31.1% Br

*Example 3.—3-Semicarbazone of 17α-hydroxy-21-bromo-Δ4-pregnene-3,11,20-trione (Formula V)*

1.1 g. of semicarbazide chlorohydrate and 0.8 g. of anhydrous sodium acetate are added to 40 cc. of 99% pure acetic acid. Nitrogen is passed through said mixture while heating to 45–50° C. An acetic acid solution of semicarbazide is obtained while sodium chloride remains undissolved. 2 g. of 4,21-dibromo-17α-hydroxy pregnane-3,11,20-trione, melting at 210° C., are added at 45° C. and the mixture is allowed to remain at said temperature for 15 minutes. 10 cc. of water are added whereby first complete solution takes place followed by precipitation of crystals. The mixture is cooled to 20° C. and kept at said temperature for 1 hour. 30 cc. of water are then added, the crystalline product is filtered off and triturated several times with water. After drying at 50° C., 1.72 g. of the semicarbazone containing 1 mol of acetic acid per mol semicarbazone are obtained. Yield: 80%. Bromine content: 14.7%; the theoretical bromine content of the semicarbazone crystallizing with 1 mol of acetic acid is 14.8%. Said product starts to decompose at 210° C. and melts above 370° C.

To purify the compound for analysis it is dissolved by boiling in 170 parts by volume of ethanol. On cooling, the semicarbazone crystallizes in colorless needles with 1 mol of ethanol. Yield: 61%.

Analysis: $C_{22}H_{30}O_4N_3Br + C_2H_5OH = C_{24}H_{36}O_5N_3Br$

Calculated__
54.75% C; 6.89% H; 15.20% O; 7.98% N; 15.18% Br
Found__
54.6% C; 6.9% H; 15.4% O; 8.0% N; 14.8% Br

*Example 4.—Preparation of 17α-hydroxy-21-bromo-Δ4-pregnene-3,11,20-trione (Formula VI)*

A suspension of 2 g. of the crude 3-semicarbazone of 17α-hydroxy-21-bromo-Δ4-pregnene-3,11,20-trione obtained according to Example 3, in 20 cc. of pure acetic acid is heated to 60° C. while passing nitrogen therethrough. 2 cc. of a 50% aqueous solution of pyruvic acid are added thereto. The temperature is increased to 90° within 15 minutes. Thereby the semicarbazone is completely dissolved. The temperature is kept at 90–95° C. for one hour. During said period of time gradually crystallization takes place. The mixture is cooled to 15° C. The crystalline product is filtered off and is washed with a small amount of acetic acid and then with water. After drying at 50° C., 1.3 g. of the triketone are obtained. Yield: 83.5%. Melting point (on the block): 297° C.

This product is purified in order to obtain an analytically pure product, by dissolving the crude product, while heating under reflux, in 40 parts by volume of boiling acetic acid, and allowing the pure product to crystallize. Melting point (on the block): 297–300° C.

Analysis: $C_{21}H_{27}O_4Br$:

Calculated _____ 59.57% C; 6.43% H; 18.88% Br
Found _____ 50.6% C; 6.5% H; 19.4% Br

*Example 5.—Cortisone acetate (Formula II)*

1.45 g. of sodium iodide containing 5.8% of water and 30 cc. of acetone containing 0.3% of water are introduced into a three neck 100 cc. round bottom flask provided with condenser and stirring device. 3 g. of 17α-hydroxy-21-bromo-Δ4-pregnene-3,11,20-trione of Formula VI obtained according to Example 4 are added at room temperature to the slightly turbid sodium iodide solution. The mixture is stirred at room temperature for 15 minutes. 3.6 g. of anhydrous potassium acetate and 0.7 cc. of distilled water are added thereto. The mixture is heated to boiling under reflux and kept at said temperature for an hour. The suspended product gradually dissolves. An aqueous layer separates at the bottom of the flask. The reaction mixture is then poured into 300 cc. of ice water. The precipitate is filtered off, washed with water, and dried in a vacuum over potassium hydroxide. 2.55 g. of cortisone acetate are obtained corresponding to a yield of 89.5%. Melting point: 241° C.; rotatory power $[\alpha]_D$: +170° (c: 0.5% in acetone).

The crude acetate is dissolved in 40 parts by volume of acetone by boiling under reflux. The warm solution is filtered and concentrated by evaporation to 3 to 4 parts by volume. The concentrated solution is kept at −5° C. overnight. The precipitate is filtered off and dried in a vacuum. Yield on purification: 92%. Total yield starting with the brominated triketone of Formula VI: 82%. Melting point: 243° C. The compound mixed with authentic cortisone acetate does not give any depression in melting point. Rotatory power $[\alpha]_D$: +178° (c: 0.5% in acetone).

*Example 6.—Cortisone (Formula II)*

The theoretical amount of 0.1 N methanolic potassium hydroxide solution is added, within one hour, in a nitrogen atmosphere at 25° C., to a solution of the bromo triketone of Formula VI in alcohol. A solution is obtained which, on removing the alcohol by distillation in a vacuum, yields cortisone. The crude product is recrystallized from a mixture of ethanol and chloroform (1:1). The recrystallized compound, on mixing with standard cortisone does not give a depression in melting point and melts at 236–237° C.

In the foregoing examples many changes and variations may be made by those skilled in the art in accordance with the principles set forth herein and in the claims attached hereto. Thus, for instance, there may be used, in the place of tertiary butanol, any other inert solvent, such as tertiary amyl alcohol and others. Solvents, such as acetic acid and methanol are also suitable, since they are not affected by the bromo oxidizing agent.

Bromo oxidation may be performed in the presence of other oxidizable primary and secondary alcohols than benzyl alcohol used in Example 2.

N-bromo succinimide may be replaced by other N-bromo acylimides, N-bromo acylamides, or N-bromo hydantoins, added in equimolecular amounts, such as N-bromo acetamide, N-bromo phthalimide, N-bromo diphenyl hydantoin. During bromo oxidation a certain amount of water must always be present in the reaction mixture.

As stated above, it is possible to use, instead of semicarbazide, equimolecular amounts of other hydrazine compounds, such as phenyl hydrazine, 2,4-dinitro phenyl hydrazine mentioned above, and other monocyclic aryl hydrazines.

Instead of with pyruvic acid, cleavage of the semicarbazone or other hydrazone derivatives may be effected by means of equimolecular amounts of other suitable aldehydes and ketones such as p-hydroxy benzaldehyde, m-hydroxy benzaldehyde, p-carboxy benzaldehyde, m-carboxy benzaldehyde and others.

Sodium iodide, in the conversion of the 21-bromine atom into a hydroxyl group or an acyloxy group, may be replaced by equimolecular amounts of other alkali iodides.

Not only cortisone acetate but also other esters of cortisone can be produced according to this invention by using, in the place of alkali or silver acetate for reaction with the 21-bromo or iodo compound, the alkali salts or the silver salts of other acids, such as benzoic acid, propionic acid, butyric acid, cyclopentano propionic acid and others.

The temperature during oxidative bromination is preferably between about 50° C. and about 70° C. and more particularly at about 60° C. It depends, however, upon the activity of the N-bromo acylimide, N-bromo acylamide, or N-bromo hydantoine used for carrying out said oxidative bromination.

Cleavage of the hydrazone, especially of the semicarbazone is preferably effected at about 90–95° C. Other temperatures, however, may also be employed depending upon the hydrazone to be split and upon the aldehyde or ketone used for cleavage.

Saponification of the 21-bromo compound is preferably effected by means of alcoholic alkali hydroxide solution. Other saponifying agents which may be used for this reaction are, for instance, aqueous potassium or sodium hydroxide.

The saponification temperature is, of course, dependent upon the saponifying agent used and should be kept as low as possible.

In the place of sodium acetate for converting the 21-bromo triketone of Formula VI into cortisone esters, other metal salts of organic acids, the metal moiety thereof having a great affinity to bromine, such as silver and lead acetate, may be employed.

The starting material employed in Example 2, the 17α-hydroxy-21-bromo pregnane-3,11,20-trione, is prepared as follows:

5 g. of 3α,17α-dihydroxy-11,20-diketo-21-bromo pregnane are dissolved in 50 cc. of tertiary butanol and 10 cc. of water. 4.4 g. of N-bromo succinimide, i. e., an excess of 5% over the theoretical amount, are added to said solution. The temperature of the reaction mixture is increased to 50° C. After 3 minutes complete solution has taken place and the solution, due to the bromine set free, has become of red color. After 8 minutes the oxidized product crystallizes. The reaction mixture is immediately added to ice water containing 4 cc. of sodium bisulfite solution. The colorless crystals are filtered off, washed with water, and dried at 35–40° C. 4.75 g. are obtained melting at 245° C. and having a rotatory power $[\alpha]_D$: +85.8°±1 (c: 1% in chloroform solution). Yield: 96%.

By recrystallization from acetone or ethyl acetate, thin hexagonal platelets are obtained, the melting point of which is the same as before recrystallization.

Analysis.—Calculated for $C_{21}H_{29}O_4Br$: 59.29% C; 6.87% H; 18.79% Br; 15.05% O. Found: 59.1% C; 7.1% H; 18.8% Br; 15.5% O, 59.5% C; 6.9% H.

We claim:

1. In an improved process of producing cortisone and its esters from 3α,17α-dihydroxy-21-bromo pregnane-11,20-dione, the steps comprising heating a homogeneous solution of 3α,17α-dihydroxy-21-bromo pregnane-11,20-dione and tertiary butanol at about 65–70° C. with N-bromo succinimide in the presence of about 10% of water, said brominated diketone and said N-bromo succinimide being reacted with each other in the proportion of 1 mol of the bromo diketone to 2 mols of N-bromo succinimide, maintaining the temperature of said reaction mixture at 65–70° C. until a yellowish transparent solution results, diluting said solution with water at 65–70° C. to cause crystallization of 4,21-dibromo-17α-hydroxy pregnane-3,11,20-trione, cooling said mixture, filtering off the dibromo compound, adding said dibromo compound to a solution of semicarbazide in acetic acid containing sodium acetate, maintaining the temperature of said reaction mixture at about 45° C., precipitating the resulting 3-semicarbazone of 17α-hydroxy-21-bromo-Δ4-pregnene-3,11,20-trione by the addition of water to the reaction mixture, suspending said semicarbazone in acetic acid, adding to said suspension a concentrated aqueous solution of pyruvic acid, heating the mixture to 90–95° C. to cause cleavage of said semicarbazone, cooling the reaction mixture, filtering off the resulting crystals of 17α-hydroxy-21-bromo-Δ4-pregnene-3,11,20-trione, adding said trione compound to a solution of sodium iodide in acetone containing a small amount of water, adding to said mixture an alkali acetate, boiling said mixture under reflux until the triketone is completely dissolved and an aqueous layer separates, pouring the reaction mixture into ice water, filtering off the precipitated cortisone acetate, and washing and drying said cortisone compound.

2. In an improved process of producing cortisone and its esters from 3α,17α-dihydroxy-21-bromo pregnane-11,20-dione, the steps comprising heating a homogeneous solution of 3α,17α-dihydroxy-21-bromo pregnane-11,20-dione and tertiary butanol at about 65–70° C. with N-bromo succinimide in the presence of about 10% of water, said brominated diketone and said N-bromo succinimide being reacted with each other in the proportion of 1 mol of the bromo diketone to 2 mols of N-bromo succinimide, maintaining the temperature of said reaction mixture at 65–70° C. until a yellowish transparent solution results, diluting said solution with water at 65–70° C., to cause crystallization of 4,21-dibromo-17α-hydroxy pregnane-3,11,20-trione, cooling said mixture, filtering off the dibromo compound, adding said dibromo compound to a solution of semicarbazide in acetic acid containing sodium acetate, maintaining the temperature of said reaction mixture at about 45° C., precipitating the resulting 3-semicarbazone of 17α-hydroxy-21-bromo-Δ4-pregnene-3,11,20-trione by the addition of water to the reaction mixture, suspending said semicarbazone in acetic acid, adding to said suspension a concentrated aqueous solution of pyruvic acid, heating the mixture to 90–95° C. to cause cleavage of said semicarbazone, cooling the reaction mixture, filtering off the resulting crystals of 17α-hydroxy - 21 - bromo - Δ4 - pregnene - 3,11,20 - trione, dissolving said triketone in alcohol, adding thereto an equimolecular amount of N/10 methanolic alkali hydroxide solution, keeping said saponification mixture in a nitrogen atmosphere at about 25° C. to cause saponification of the 21-bromine atom, removing the alcohol from said saponification solution, and isolating cortisone from the residue.

3. In an improved process of producing cortisone compounds from 3α,17α-dihydroxy-21-bromo pregnane-11,20-dione, the steps comprising heating a mixture of an N-bromo acylimide and 3α,17α-dihydroxy-21-bromo pregnane-11,20-dione in the presence of water and of an oxidizable alcohol at a temperature between about 50° C. and about 70° C., the reaction components being present in said reaction mixture in the proportion of one mol of said steroid compound to 2 mols of said N-bromo acylimide to at least one mol of said oxidizable alcohol, reacting the resulting 4,21-dibromo-17α-hydroxy pregnane-3,11,20-triketone with a hydrazine compound, splitting up the resulting 3-hydrazone to produce the 17α-hydroxy-21-bromo-Δ4-pregnene-3,11,20-trione, and converting said unsaturated 21-bromo trione compound into said cortisone compound.

4. In an improved process of producing cortisone compounds according to claim 3, wherein the oxidizable alcohol is the 3α,17α-dihydroxy-21-bromo pregnane-11,20-dione itself.

5. In an improved process of producing cortisone compounds according to claim 3, wherein the N-bromo acylimide is N-bromo succinimide.

6. In an improved process of producing cortisone compounds according to claim 3, wherein the hydrazine compound is semicarbazide.

7. In an improved process of producing cortisone compounds according to claim 3, wherein the 17α-hydroxy-21-bromo-Δ4-pregnene-3,11,20-trione obtained on cleavage of the 3-hydrazone compound is saponified to form cortisone.

8. In an improved process of producing cortisone compounds according to claim 3, wherein the 17α-hydroxy-21-bromo-Δ4-pregnene-3,11,20-trione obtained on cleavage of the hydrazone compound is first converted into the corresponding 21-iodo compound by the action of an alkali iodide and wherein the 21-iodo compound is subsequently saponified to cortisone.

9. In an improved process of producing cortisone compounds according to claim 3, wherein the 17α-hydroxy-21-bromo-Δ4-pregnene-3,11,20-trione obtained on cleavage of the hydrazone is converted into a cortisone ester by reacting said triketone with a metal salt of an organic acid having a great affinity to bromine.

10. In an improved process of producing cortisone compounds according to claim 3, wherein the 17α-hydroxy-21-bromo-Δ4-pregnene-3,11,20-trione obtained on cleavage of the hydrazone compound is first converted into the corresponding 21-iodo compound by the action of an alkali iodide and wherein the 21-iodo compound is subsequently converted into a cortisone ester by reacting said 21-iodo triketone compound with a metal salt of an organic acid.

11. In an improved process of producing cortisone compounds from 3α,17α-dihydroxy-21-bromo pregnane-11,20-dione, the steps comprising oxidizing 3α,17α-dihydroxy-21-bromo pregnane-11,20-dione to form the corresponding 17α-hydroxy-21-bromo pregnane-3,11,20-trione, heating a mixture of an N-bromo acylimide and said trione in the presence of an oxidizable alcohol at a temperature between about 50° C. and about 70° C., the reaction components being present in said reaction mixture in the proportion of one mol of said triketone to 2 mols of said N-bromo acylimide to at least one mol of said oxidizable alcohol, reacting the resulting 4,21-dibromo-17α-hydroxy pregnane-3,11,20-triketone with a hydrazine compound, splitting up the resulting 3-hydrazone to produce the 17α-hydroxy-21-bromo-Δ4-pregnene-3-11,20-trione, and converting said unsaturated 21-bromo trione compound into said cortisone compound.

12. In an improved process of producing cortisone and its esters from 3α,17α-dihydroxy-21-bromo pregnane-11,20-dione, the steps comprising heating a homogeneous solution of 3α,17α-dihydroxy-21-bromo pregnane-11,20-dione and tertiary butanol at about 65–70° C. with N-bromo succinimide in the presence of water, said brominated diketone and said N-bromo succinimide being reacted with each other in the proportion of 1 mol of the bromo diketone to 2 mols of N-bromo succinimide, maintaining the temperature of said reaction mixture at 65–70° C. until a yellowish transparent solution results, diluting said solution with water at 65–70° C. to cause crystallization of 4,21-dibromo-17α-hydroxy pregnane-3,11,20-trione, cooling said mixture, filtering off the dibromo compound, adding said dibromo compound to a solution of semicarbazide in acetic acid containing sodium acetate, maintaining the temperature of said reaction mixture at about 45° C., precipitating the resulting 3-semicarbazone of 17α-hydroxy-21-bromo-Δ4-pregnene-3,11,20-trione by the addition of water to the reaction mixture, suspending said semicarbazone in acetic acid, adding to said suspension a concentrated aqueous solution of pyruvic acid, heating the mixture to 90–95° C. to cause cleavage of said semicarbazone, cooling the reaction mixture, filtering off the resulting crystals of 17α-hydroxy-21-bromo-Δ4-pregnene-3,11,20-trione, adding said trione compound to a solution of sodium iodide in acetone containing a small amount of water, adding to said mixture a metal salt of an organic acid, boiling said mixture under reflux until the triketone is completely dissolved and an aqueous layer separates, pouring the reaction mixture into ice water, filtering off the precipitated cortisone ester, and washing and drying said cortisone compound.

13. In an improved process of producing cortisone and its esters from 3α,17α-dihydroxy-21-bromo pregnane-11,20-dione, the steps comprising heating a homogeneous solution of 3α,17α-dihydroxy-21-bromo pregnane-11,20-dione and tertiary butanol at about 65–70° C. with N-bromo succinimide in the presence of water, said brominated diketone and said N-bromo succinimide being reacted with each other in the proportion of 1 mol of the bromo diketone to 2 mols of N-bromo succinimide, maintaining the temperature of said reaction mixture at 65–70° C. until a yellowish transparent solution results, diluting said solution with water at 65–70° C., to cause crystallization of 4,21-dibromo-17α-hydroxy pregnane-3,11,20-trione, cooling said mixture, filtering off the dibromo compound, adding said dibromo compound to a solution of semicarbazide in acetic acid containing sodium acetate, maintaining the temperature of said reaction mixture at about 45° C., precipitating the resulting 3-semicarbazone of 17α-hydroxy-21-bromo-Δ4-pregnene-3,11,20-trione by the addition of water to the reaction mixture, suspending said semicarbazone in acetic acid, adding to said suspension a concentrated aqueous solution of pyruvic acid, heating the mixture to 90–95° C. to cause cleavage of said semicarbazone, cooling the reaction mixture, filtering off the resulting crystals of 17α-hydroxy-21-bromo-Δ4-pregnene-3,11,20-trione, dissolving said triketone in alcohol, adding thereto an equimolecular amount of an N/10 methanolic alkali hydroxide solution, keeping said saponification mixture in a nitrogen atmosphere at about 25° C. to cause saponification of the 21-bromine atom, removing the alcohol from said saponification solution, and isolating cortisone from the residue.

References Cited in the file of this patent

UNITED STATES PATENTS

| | | |
|---|---|---|
| 2,596,563 | Kaufman | May 13, 1952 |
| 2,656,368 | Graber | Oct. 20, 1953 |
| 2,666,067 | Hanze | Jan. 12, 1954 |
| 2,666,068 | Hanze | Jan. 12, 1954 |
| 2,686,187 | Clinton | Aug. 10, 1954 |

OTHER REFERENCES

Kritchevsky: Jour. Am. Chem. Soc. 74, 483–86 (1952).